United States Patent [19]
Holden

[11] Patent Number: 5,938,181
[45] Date of Patent: Aug. 17, 1999

[54] FISH LEADER FOR TERMINATED ELECTRICAL CABLES

[75] Inventor: Thomas J. Holden, Warrington, Pa.

[73] Assignee: Strongarm Designs, Inc., Horsham, Pa.

[21] Appl. No.: 09/070,021

[22] Filed: Apr. 30, 1998

[51] Int. Cl.⁶ ................................................. F21C 29/16
[52] U.S. Cl. .............................................. 254/134.3 FT
[58] Field of Search .................. 439/476.1, 483, 439/484, 446, 445, 148, 138, 149, 159, 160; 385/136; 294/1.1; 254/139.3 FT, 139.3 R

[56] References Cited

U.S. PATENT DOCUMENTS

| | | | |
|---|---|---|---|
| D. 159,196 | 7/1950 | Englar | 439/484 |
| 1,462,435 | 7/1923 | West | 294/1.1 |
| 2,532,504 | 12/1950 | Lapsley | 254/134.3 R |
| 4,684,161 | 8/1987 | Egner et al. | 385/136 |
| 4,684,211 | 8/1987 | Weber et al. | 385/136 |
| 5,129,027 | 7/1992 | Boero et al. | |
| 5,409,397 | 4/1995 | Karman | 439/484 |
| 5,480,203 | 1/1996 | Favalora et al. | |
| 5,505,432 | 4/1996 | Noonan | |

*Primary Examiner*—Robert C. Watson
*Attorney, Agent, or Firm*—Gregory J. Gore

[57] ABSTRACT

A fish leader for pulling terminated cables through conduits or other passageways includes a coupler which attaches directly to the cable connector. The trailing surface of the coupler matches the lateral profile of the mating surface of the connector and therefore minimizes the lateral dimension of the attached connector/coupler pair. The coupler attaches to the connector using the existing connector fastening screws which engage threaded holes in the coupler. A curved and tapered leading front surface of the coupler enables it to deflect around obstructions as it is moved through the conduit. A swivel attachment at the front of the coupler provides attachment for a pulling member, such as a cable string or fish tape. The trailing surface of the coupler includes a recess to enclose the connector pins, protecting them from damage while pulling the cable.

16 Claims, 2 Drawing Sheets

FISH LEADER FOR TERMINATED ELECTRICAL CABLES

FIELD OF THE INVENTION

The present invention relates to a fish leader that attaches by mechanical connection to the end of an electrical connector to pull the terminated connector and an associated cable through a conduit or tight space.

BACKGROUND OF THE INVENTION

Electrical connectors and cables are commonly fished through a conduit, or tight passageway, by first attaching the connector or cable to a fish tape. A typical fish tape may include a drawing head that has an elongated, flexible wire and means for enclosing the electrical terminations. The fish tape is then fed backward through one end of a conduit. At the opposite end of the conduit, the fish tape is attached to the cable and pulled back through, the conductor and cable being drawn through with it. The fish tape and drawing head are then detached. A problem that occurs with fish tapes or drawing heads is that they often get caught in bends or obstructions in the conduit and cannot be pulled through. This is especially true where the cables are stiff electrical cables that comprise bundled conductors. Often, they can become jammed in a conduit and possibly damaged. This process is extremely labor-intensive and expensive for manufacturers of equipment having internally-routed terminated electrical cables.

In Noonan, U.S. Pat. No. 5,505,432, the fish tape is provided with an anti-snagging device to minimize jams in the conduit. The device includes a spherical roller to roll over obstructions in a conduit so that the fish tape is freely fed and retracted through the conduit. Similarly, in Langston, U.S. Pat. No. 5,029,816, a fiber optic cable is pulled through a conduit with a series of large-diameter capstan winches placed at intermediate access points along the conduit. Each capstan pulls a portion of the cables and if the cable snags, then the winches stop pulling. Although Noonan and Langston address the problem of snagging electrical conductors and fiber optic cables, they do not address the installation of cables with connectors.

Favalora et al, U.S. Pat. No. 5,480,203, discloses a pulling tool for cables and cables with connectors. The pulling tools have a mesh sleeve with an open end for receiving the ends of cables and a closed end with an attached pulling member. In Boero et al, U.S. Pat. No. 5,129,027, a drawing head pulls ribbon-type optical cables with connectors. The drawing head has grooves in a slotted core for receiving the optical fiber ribbons. Both Favalora et al and Boero et al enclose the connectors for protection. There is therefore a need in the art for an improved device and method for quickly and easily fishing connector-terminated electrical cables.

SUMMARY OF THE INVENTION

The present invention is directed to a fish leader that pulls terminated cables, that is, cables with connectors attached, while protecting the connector and minimizing snagging of the cable in a conduit through which it is pulled. The fish leader is inserted into the conduit at one end and exits at the other end where it is attached to the connector end of the cable. The fish leader includes a coupler, which attaches to the cable connector on one side and a pulling member on the other side. The trailing surface of the coupler matches the lateral profile of the mating surface of the connector to eliminate any longitudinally exposed edges of the connector. The fish leader of the present invention therefore minimizes the lateral dimension of the connector/coupler pair, minimizes the pull force, and facilitates passage around obstructions in the conduit. In addition, the present leader uses the existing connector fastening screws to couple the connector. This minimizes the need for additional parts and provides a very strong connection. The cable routing process is further enhanced because when tensile forces are applied, the cable is positioned in coaxial alignment with the pulling member.

Other objects, advantages and novel features of the invention will become apparent from the following detailed description of the invention when considered in conjunction with the accompanying drawings.

The coupler has a tapered, curved leading front surface which in one embodiment includes a swivel attachment. It is made of a material with a slick surface to minimize pull force and allow passage through the conduit. The pulling member, which may be a pull cable, a string, or fish tape, is attached to the swivel eyelet of the coupler. A recess in the trailing surface of the coupler provides an enclosure to protect the connector pins which project from the face of the connector. Multiple cables may also be pulled simultaneously with a single fish leader by attaching the couplers in a staggered array such that the couplers go through serially, that is, spaced several inches apart.

More specifically, the applicant has devised a fish leader for routing terminated electrical cables, especially those comprising a bundle of individual electrical conductors like the type commonly used for connecting computer components, such as a CRT display monitor, comprising: a pulling member attached to a coupler for pulling the connector-terminated cable. The coupler has a curved leading surface and a trailing surface which matches the lateral profile of the face of the connector and is attached by means of screws on the connector. This provides a secure, positive attachment between the coupler and the connector and permits the tensile force exerted by the pulling member to be applied in axial alignment with the electrical cable to reduce the size of its profile. The coupler includes a recess to which encloses and thus protects the connector pins as the connector is fished through the conduit.

DESCRIPTION OF THE PREFERRED EMBODIMENT

Figure 1:
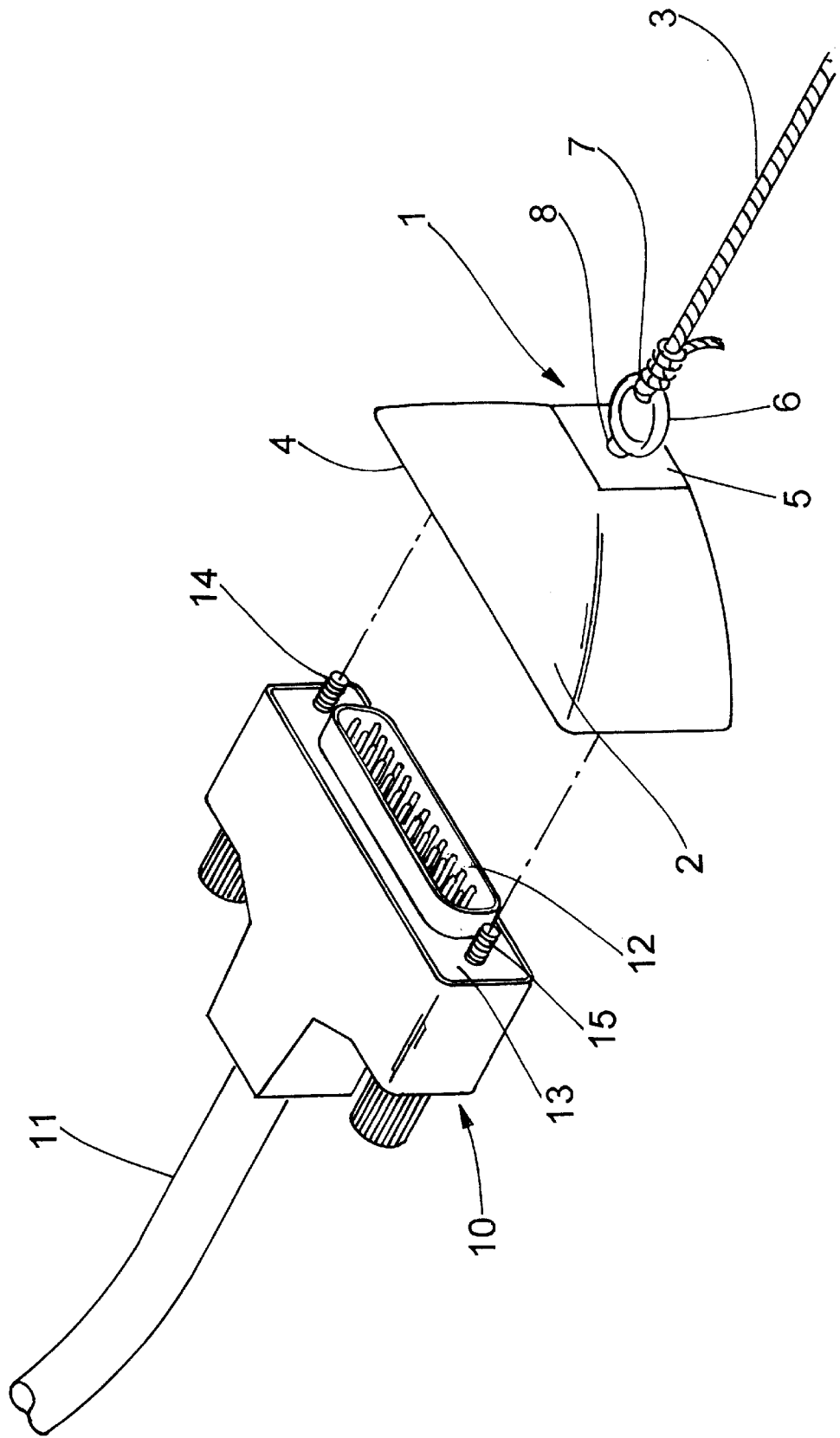
FIG. 1 is a top left isometric view of the fish leader of the present invention.

FIG. 1 illustrates the present fish leader 1 having a coupler 2 and a pulling member 3. Coupler 2 has a tapered and radiused smooth shape, with the attachment end 4 convergent toward the leading end 5. As the fish leader 1 is pulled through a conduit, cableway, or passageway, the coupler can freely deflect around obstructions or corner bends. The swivel eyelet 6 is rotatably attached to the leading end of the coupler 2 by member 8 which is rotatable and captive within the coupler body. The attachment end 4 includes a trailing face of the coupler joined at the mechanical connection 12 on the front 13 of the connector 10 by the connector screws for threaded attachment. The coupler 2 fits closely to the leading edge shape of the connector 10 and covers the front 13 of the connector 10 to protect the connector 10 and its electrical contact pins. Screws 14 and 15 on the connector 10 attach directly to the coupler 2. For example, the coupler would receive on a DB-type connector screw, a molded-in clip on a modular connector, and a bayonet on a fiber connector. The fish leader of the present invention is not suitable for connectors that do not have an adequate mechanical attachment for pulling, such as the keyboard DIN style. The coupler 2 is made of a slick surfaced material, such as Delron®, to minimize pull force and allow passage through the conduit. The various structural features of the coupler more specifically described below may be created by machining a solid piece of Delron®. All of the edges of the coupler are radiused to provide smooth areas of possible contact. The pulling member 3 may be a pull cable, a string, fish tape, or other strong and flexible member, and is simply attached by tying a string around the loop 7 of the swivel eyelet 6.

Figure 2A:
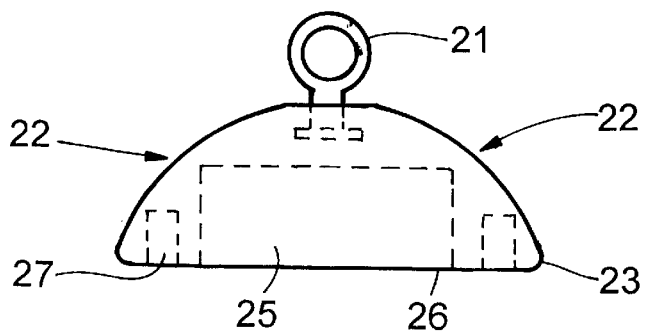
FIGS. 2a, 2b and 2c are top, front, and side views respectfully of an embodiment of the present invention.
Figure 2B:
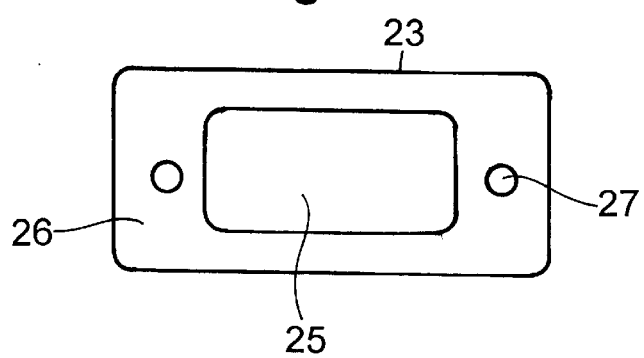
Figure 2C:
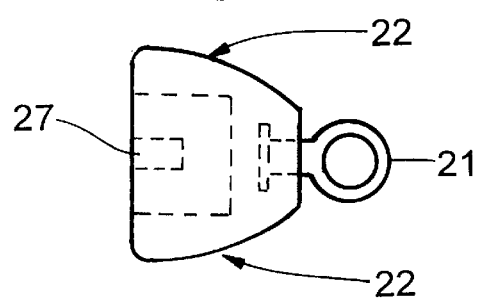
Figure 3:
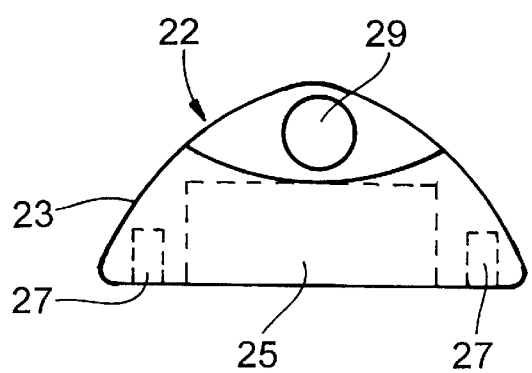
FIGS. 3 is a top view of an embodiment of the present invention.

Referring now to FIGS. 2a and 3, two different embodiments of the present invention are shown. In FIGS. 2a through 2c, an embodiment of the present invention is depicted in which a swivel eyelet is employed. Eyelet 21 is rotatably fitted within the coupler body 23. Leading surfaces 22 are smoothly radiused to reduce friction. Recess 25 is included to receive and protect the connector pin flange. The body of the coupler 23 includes internal threaded attachment means 27 which are compatible with the mating electrical connector screws. The trailing surface 26 is shaped to closely match the profile of the connector to which it is attached. Referring now to FIG. 3, an alternate embodiment includes structures similar to those shown in FIG. 2a above, namely, the threaded attachment means 27, recess 25, and curved leading surfaces 22. These structures function identically to their corresponding structures shown in FIG. 2a, except that eyelet 29 does not swivel, but is merely an aperture which passes completely through the body 23 of the coupler top-to-bottom.

Referring again to FIG. 1, The present invention operates as follows: when the fish leader 1 is attached to the connector 10 and cable 11, the pulling member 3 is pulled through the conduit and, thus, the coupler 2, connector 10, and cable 11 follow. The fish leader 1, connector 10, and cable 11 are pulled axially, straight through the conduit to minimize the size of the connection and facilitates passage through the conduit. The coupled parts can pass by obstructions, such as other wires, conduit fillings, sharp edges, and protrusions, in the conduit because the dimensional profile of the coupled parts is minimized by pulling axially on the cable connector and not by a connection directly on the side of cable 11. The swivel eyelet 6 also allows the coupler 2 and attached connector 10 to rotate and slip past obstructions. The pull force is minimized by having a slick surfaced, tapered and radiused coupler 2. As a result, the cable 11 and connector 10 are protected from damage and the cable routing is quick and easy. Multiple cables may also be pulled simultaneously with the fish leader 1 by attaching additional fish leaders to a single leader such that multiple couplers go through serially, or in other words, spaced a couple of inches apart.

Those skilled in the art to which the invention pertains may make modifications and other embodiments employing the principles of this invention without departing from the spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A fish leader for pulling terminated cables through a passageway, comprising:

a coupler for pulling a connector-terminated cable having a multi-pin connector at a leading end of said cable;

the coupler having a curved leading surface convergent toward a front end thereof from a trailing surface, said trailing surface matching the lateral profile of a mating face of said connector; and a pulling member attached to said coupler.

2. The fish leader of claim 1, wherein said cable and said pulling member are in coaxial alignment when tensile forces are applied through them.

3. The fish leader of claim 1, wherein said coupler includes attachment means for affixing the connector to said coupler.

4. The fish leader of claim 3, wherein said coupler has internally-threaded holes for receiving said connector attachment means.

5. The fish leader of claim 4, wherein said connector attachment means are screws threadably engagable with said threaded holes of said coupler.

6. The fish leader of claim 1, further including a recess within said trailing surface of said coupler for receiving and enclosing a plurality of connector pins which protrude frontally from said mating face of said connector.

7. The fish leader of claim 1, wherein said coupler further includes attachment means for affixing said pulling member thereto.

8. The fish leader of claim 7, wherein said pulling member attachment means is rotatably affixed to said coupler.

9. The fish leader of claim 7, wherein said pulling member attachment means is an aperture which passes through said coupler body.

10. The fish leader of claim 1, wherein said pulling member is a pull cable.

11. The fish leader of claim 1, wherein said pulling member is a string.

12. The fish leader of claim 1, wherein said pulling member is fish tape.

13. The fish leader of claim 1, wherein said passageway is a conduit.

14. The fish leader of claim 1, wherein said passageway is a cableway.

15. The fish leader of claim 1, further including a connector affixed to the end of said cable.

16. The fish leader of claim 15, wherein said connector is an electrical connector.

* * * * *